United States Patent
Corbeil et al.

(10) Patent No.: US 7,013,091 B2
(45) Date of Patent: Mar. 14, 2006

(54) SYNCHRONIZATION OF PULSE AND DATA SOURCES

(75) Inventors: Sacha Corbeil, Kanata (CA); David Atkinson, Ottawa (CA); Paul Fecteau, Ottawa (CA); Rajkumar Nagarajan, Ottawa (CA)

(73) Assignee: PTS Corporation, San Jose, CA (US)

( * ) Notice: Subject to any disclaimer, the term of this patent is extended or adjusted under 35 U.S.C. 154(b) by 652 days.

(21) Appl. No.: 10/050,738

(22) Filed: Jan. 16, 2002

(65) Prior Publication Data

US 2004/0208533 A1  Oct. 21, 2004

(51) Int. Cl.
*H04B 10/00* (2006.01)

(52) U.S. Cl. .................... 398/189; 398/191; 398/190

(58) Field of Classification Search ......... 398/182–201
See application file for complete search history.

(56) References Cited

U.S. PATENT DOCUMENTS

| 5,311,351 | A |   | 5/1994  | Chesnoy |
|-----------|---|---|---------|---------|
| 5,513,030 | A | * | 4/1996  | Epworth ................ 398/198 |
| 5,822,106 | A |   | 10/1998 | Knox et al. |
| 5,872,647 | A | * | 2/1999  | Taga et al. .............. 398/185 |
| 6,229,633 | B1|   | 5/2001  | Roberts et al. |
| 6,236,488 | B1| * | 5/2001  | Shimizu et al. ........ 398/198 |

* cited by examiner

*Primary Examiner*—Agustin Bello (57) ABSTRACT

In accordance with the present invention, an improved method is provided for synchronizing a pulse stream with a data stream in an optical communications system. The improved method includes: generating an optical data signal for transmission through the optical communication system, where the data stream exhibits a duty cycle less than fifty percent and the optical data signal is formed from the pulse stream and the data stream; detecting an optical power level associated with the optical data signal; and synchronizing the pulse stream with the data stream based on the optical power level associated with the optical data signal. Specifically, the pulse stream is temporally aligned with the data stream when the average power of the optical data signal is maximized.

10 Claims, 7 Drawing Sheets

SYNCHRONIZATION OF PULSE AND DATA SOURCES

FIELD OF THE INVENTION

The present invention generally relates to optical communications systems, and, more particularly, to an improved method for synchronizing a pulse source with a data source in an optical communication system.

BACKGROUND OF THE INVENTION

There is considerable interest today in long haul optical transport networks. The most common optical transmission format for digital data in long haul applications is binary intensity modulation. In this format, a logical "1" corresponds to a pulse of light, while a logical "0" corresponds to the absence of a pulse. Light pulses are sent sequentially, at a pre-determined bit rate, where the bit period is the time duration between transmission of consecutive bits. For Non-Return-to-Zero (NRZ) transmission format, two consecutive "1"s are sent as a long pulse. In contrast, for Return-to-Zero (RZ) transmission format, each "1" corresponds to a single pulse, such that the intensity level returns to zero after each single pulse. In this transmission format, the pulse width must be smaller than the bit period. For long haul transmission, it is often advantageous to use the RZ format.

One common technique for transmitting RZ data is to optically generate a train of pulses, which are then "gated" by a data stream. The challenge associated with this approach is to properly synchronize the pulse stream with the data stream in a cost efficient manner. Past solutions, however, have generally failed in one respect or another. For instance, some solutions have included use of electrical frequency components, such as high bandwidth photodetectors and expensive RF filters. Other solutions have involved the use of driver taps and phase comparators calibrated at production, and do not adjust the actual relation as measured during use. While the first set of solutions are not cost-efficient, the latter solutions still allow for some unaccounted phase variation. Therefore, it is desirable to provide an improved method for synchronizing a pulse stream with a data stream in an optical communication system.

SUMMARY OF THE INVENTION

In accordance with the present invention, an improved method is provided for synchronizing a pulse stream with a data stream in an optical communications system. The improved method includes: generating an optical data signal for transmission through the optical communication system, where the data stream exhibits a duty cycle below fifty percent and the optical data signal is formed from the pulse stream and the data stream; detecting an optical power level associated with the optical data signal; and synchronizing the pulse stream with the data stream based on the optical power level associated with the optical data signal. Specifically, the pulse stream is temporally aligned with the data stream when the average power of the optical data signal is maximized.

For a mom complete understanding of the invention, its objects and advantages, reference may be had to the following specification and to the accompanying drawings.

DETAILED DESCRIPTION OF THE PREFERRED EMBODIMENTS

Figure 1A:
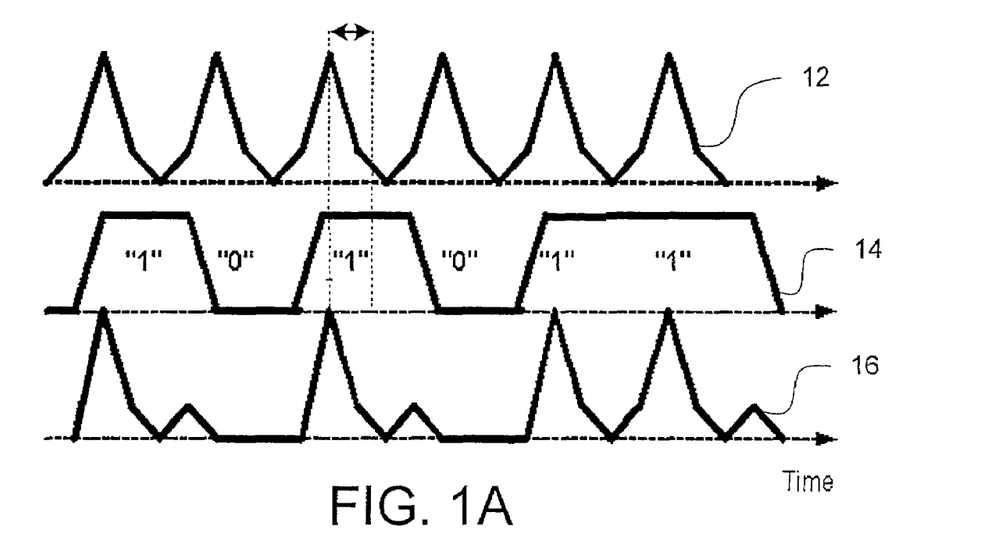
FIGS. 1A and 1B are graphs depicting a poorly synchronized pulse stream and data stream, and a property synchronized pulse stream and data stream, respectively.
Figure 1B:
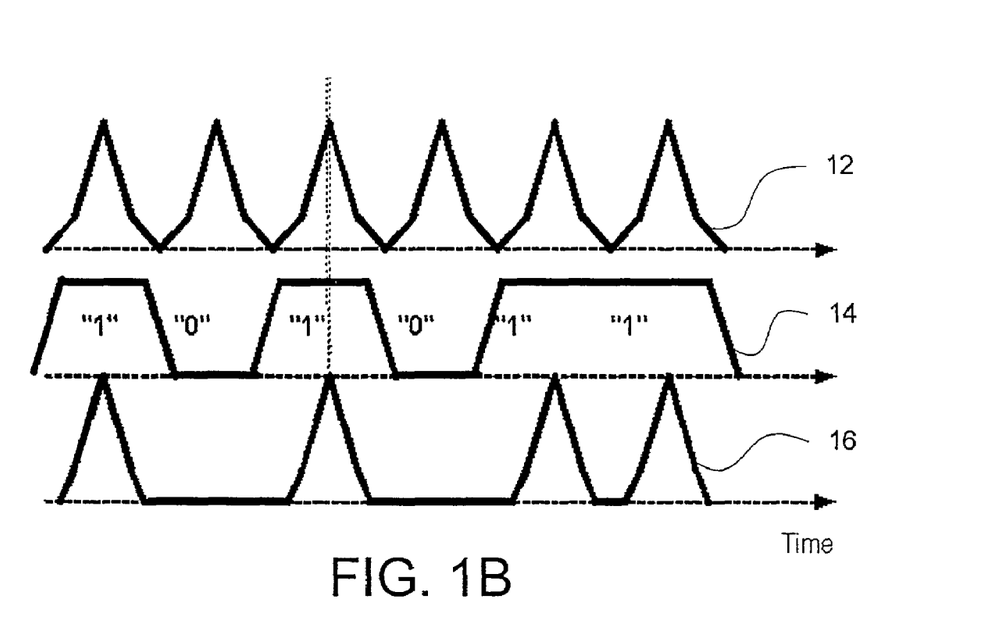

FIG. 1A illustrates how a poorly synchronized pulse stream 12 and data stream 14 will result in an optical data signal 16 having chopped pulses and residual pulses. During extreme instances of mis-synchronization, every "1" bit can result in 2 equal magnitude half-chopped pulses. In contrast, an ideally synchronized pulse stream 12 and data stream 14 will result in an optical data signal 16 having minimal residual pulses as shown in FIG. 1B. Synchronization is particularly crucial when the pulse-width is of the same order as the bit period.

Figure 2:
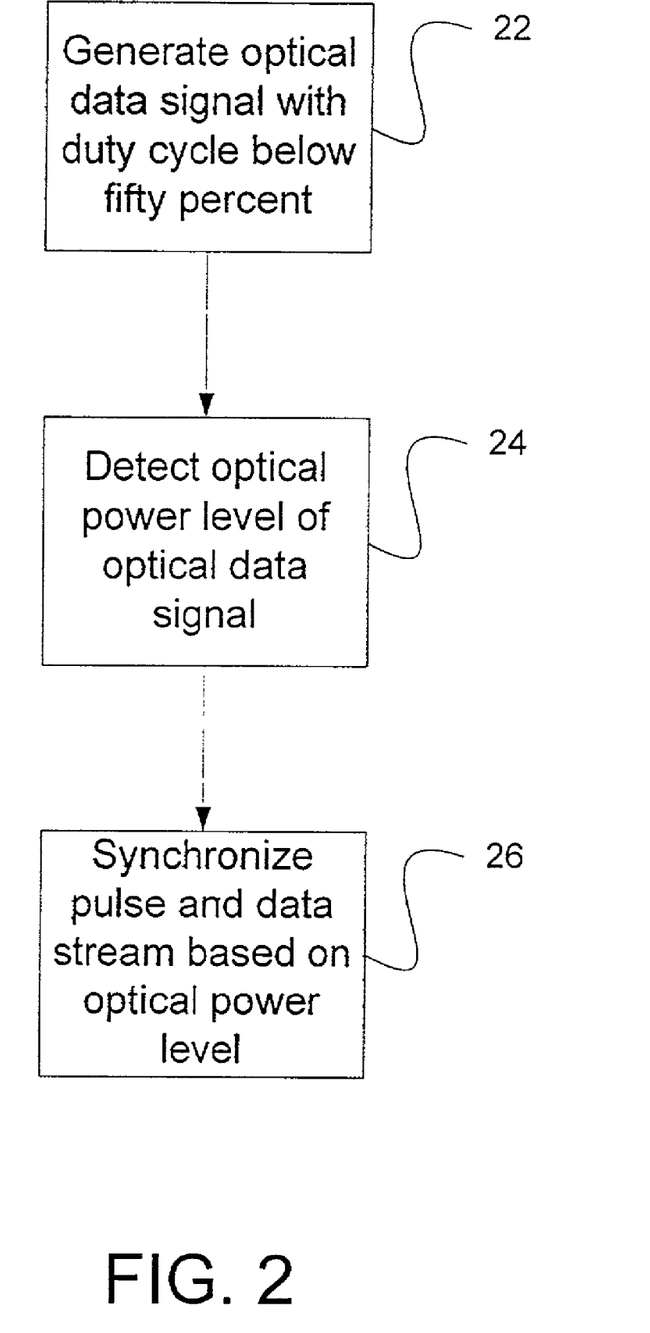
FIG. 2 is a flowchart illustrating an improved method for synchronizing a pulse stream with a data stream in accordance with the present invention.

In accordance with the present invention, an improved method is provided for synchronizing a pulse stream with a data stream as shown in FIG. 2. Synchronization is achieved by reducing the duty cycle of the modulated data stream to a level below fifty percent. An optical data signal for transmission through the optical communication system is generated at step 22, where the optical data signal is formed from the pulse stream and the data stream. Next, the optical powerlevel associated with the optical data signal is detected at step 24. Lastly, the pulse stream is synchronized with the data stream at step 26 based on the optical power level associated with the optical data signal. As will be further described below, the pulse stream is temporally aligned with (i.e., centered under) the data stream when the average power of the optical data signal is maximized.

Figure 3:
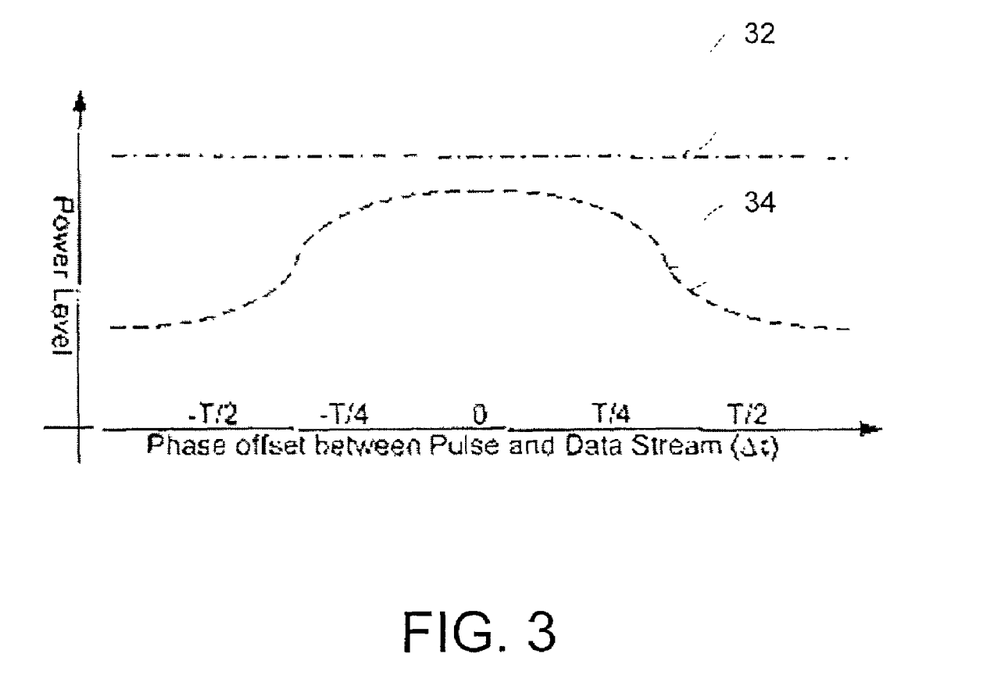
FIG. 3 is graph depicting the effect of data stream duty cycle on the average output power of an optical data signal as it relates to the phase offset between the pulse stream and the data stream.

FIG. 3 illustrates the effect of data stream duty cycle on the average output power of an optical data signal as it relates to the phase offset between the pulse stream and the data stream. For a duty cycle of fifty percent, the average power associated with the optical data signal does not change as the offset is varied between the pulse stream and the data stream as shown at 32. However, when the duty cycle is below fifty percent, the average power associated with the optical data signal varies based on the temporal alignment between the pulse stream and the data stream as shown at 34. Moreover, the pulse stream is temporally aligned with (i.e., centered under) the data stream when the average power of the optical data signal is maximized.

Figure 4:
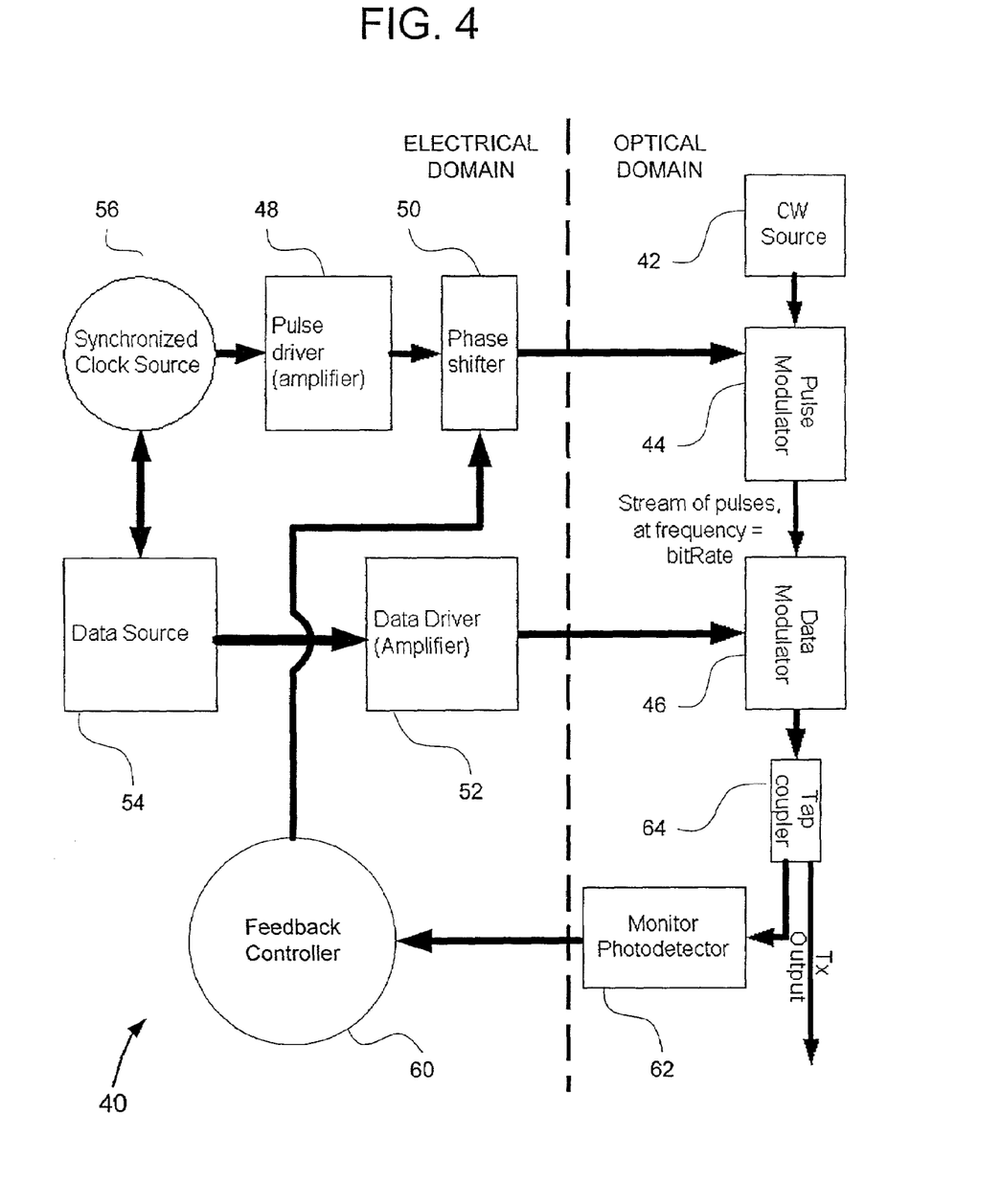
FIG. 4 is an exemplary transmitter subsystem for implementing the synchronization method of the present invention.

An exemplary transmitter subsystem 40 for implementing the synchronization method of the present invention is shown in FIG. 4. The transmitter subsystem 40 is comprised of a continuous lightwave source 42 connected in series to a pulse modulator 44 and a data modulator 46. The pulse modulator 44 modulates the continuous lightwave from the light source 42 to form a pulse stream. The pulse modulator 44 may be driven by a pulse driver 48 and a phase shifter 50 as is known in the art. The data modulator 46 in turn modulates the pulse stream from the pulse modulator 44 to form an optical data signal. The data modulator 46 may be driven by a data driver 52 and a data source 54 as is known in the art. Lastly, the pulse driver 48 and the data source may share a synchronized clock source 56. It is readily understood that other embodiments for the transmitter subsystem 40 are also within the scope of the present invention.

In order to synchronize the pulse stream with the data stream, a feedback microcontroller system 60 is interposed between the photodetector 62 and the phase shifter 50. The photodetector 62, in conjunction with a tap coupler 64, is used to detect the optical data signal at the output of the transmitter subsystem 40 as is well known in the art. The feedback microcontroller 60 is operable to determine the average optical power of the optical data signal as well as adjust the phase offset setting of the pulse stream via the phase shifter 50. As will be further described below, the feedback microcontroller 60 synchronizes the pulse stream with the data stream by maximizing the optical power level associated with the optical data signal.

Figure 5A:
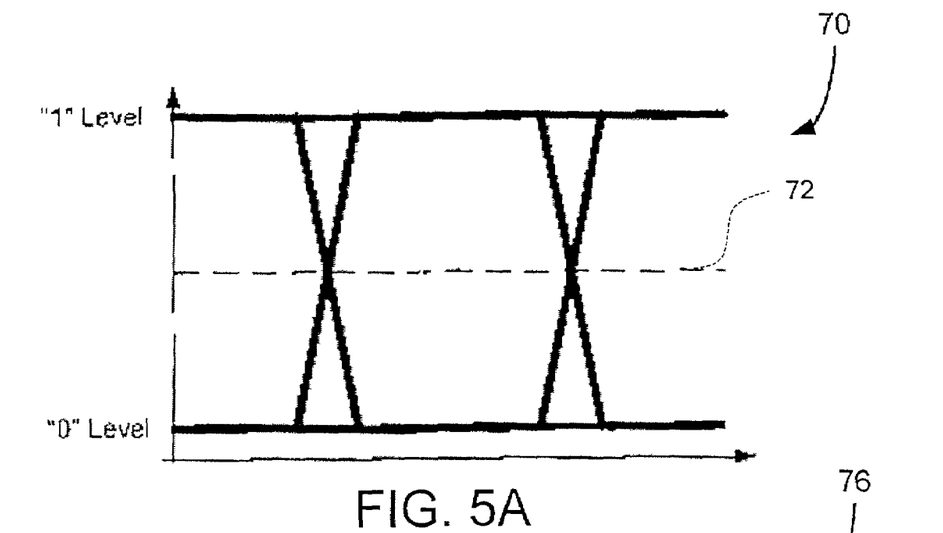
FIG. 5A is a graph depicting a regular duty cycle eye diagram.
Figure 5B:
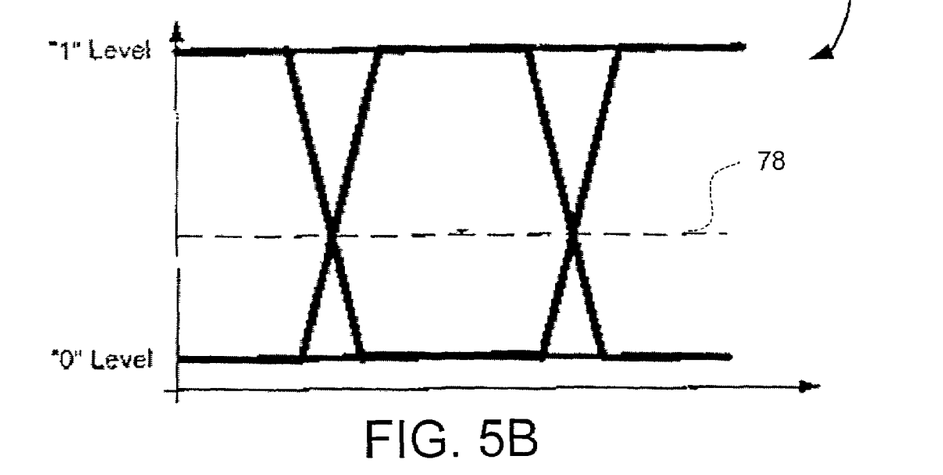
FIG. 5B is a graph depicting a reduced duty cycle eye diagram.

In optical communications, particularly at high bit rates, it is common practice to examine the "eye-diagram" of the lightwave signal. The eye-diagram is a measurement done with an oscilloscope which consists of overlapped signal lengths, where the signals are overlapped at intervals of one or more bit periods. In other words, the scope will show the signal s(t) starting at nT overlapped with the signal starting at (n+1)T, (n+2)T, (n+3)T, and so on, depending on the persistence of the oscilloscope. The crossing-level provided by such an eye-diagram correlates to the duty-cycle of the measured optical signal. Although the crossing level does not have a 1:1 mapping with the duty cycle, the crossing level will decrease as the duty cycle decreases as shown in FIGS. 5A and 5B. In a preferred embodiment of the present invention, the crossing-level is used to set the duty-cycle.

An exemplary technique for setting the duty-cycle is further described below. By examining the "eye" of the data modulation, it is possible to reduce the duty cycle to a value lower than fifty percent. Referring to FIG. 5A, a regular duty cycle eye diagram 70 has a regular crossing level 72 of fifty percent. In the absence of RZ pulses (i.e., with the pulse stream disabled), one may reduce the duty cycle of the modulated data using the crossing level of the eye-diagram as a guide. An exemplary reduced duty cycle eye diagram 76 having a reduced crossing level 78 of forty percent is shown in FIG. 5B. This reduced crossing level 78 may be achieved in a number of ways.

In accordance with the present invention, at least two ways exist for reducing the duty cycle. A first way of reducing the duty cycle involves reducing the duty cycle electrically where the data source (typically, the data driver) provides the means for manipulating the duty cycle. Reducing the duty cycle electrically directly translates into a reduced optical duty cycle, when using the same bias and amplitude levels as those required for a 50% duty cycle. A second way of reducing the duty cycle involves manipulating the optical modulator by reducing the amplitude of the electrical voltage input to the data modulator. One skilled in the art will readily appreciate that additional ways of reducing the duty cycle are also within the broader aspects of the present invention.

Figure 6:
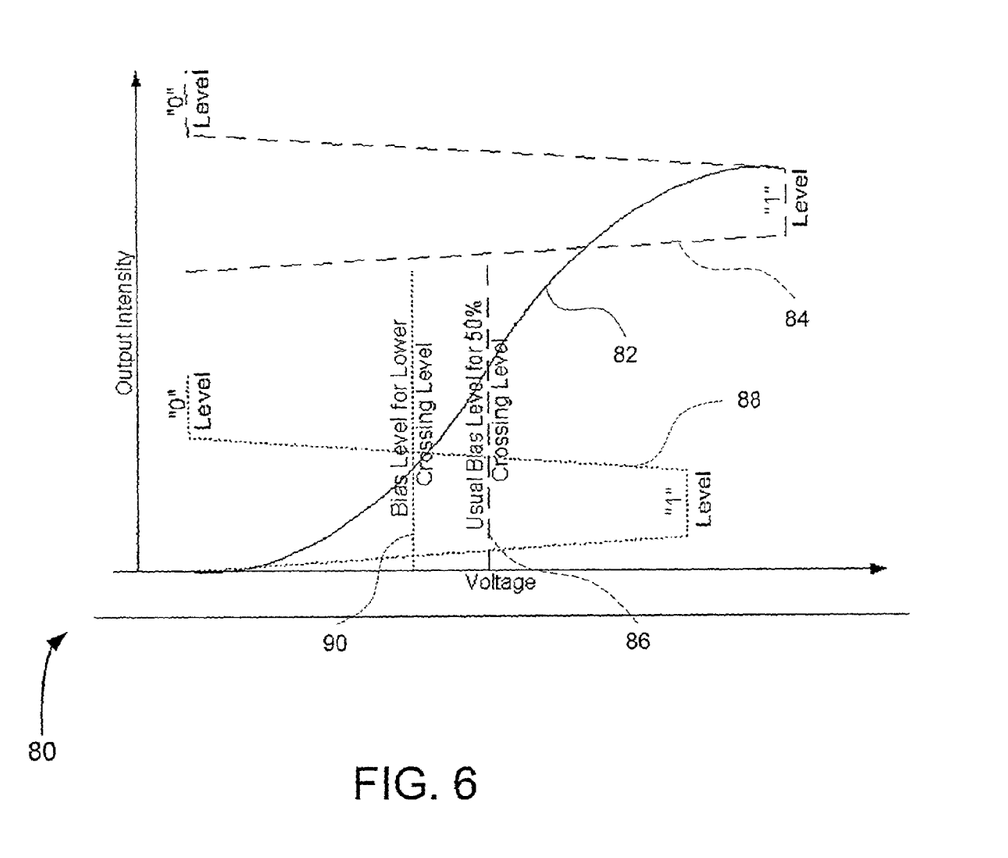
FIG. 6 is a graph of an electro-optic Mach-Zehnder modulator transfer function depicting a lower optical bias level according to the present invention.

Reducing the duty cycle optically, however, requires that particular attention be given to the optical bias level. For illustration purposes, an exemplary electro-optic Mach-Zehnder modulator transfer function 80 is shown in FIG. 6. Output intensity is graphed versus optical drive voltage at 82. The amplitude of a regular duty cycle data pulse 84 has its "0" level aligned with a zero optical output intensity by properly setting the regular bias level 86 as well known in the art. The reduced amplitude of a reduced duty cycle data pulse 88 is of a lower magnitude, and if the same bias level were used as for amplitude of a regular duty cycle data pulse 84, then its "0" level would not be aligned with the zero optical output intensity. Thus, a reduced bias level 90 is required to ensure that the "0" level of the reduced amplitude of a reduced duty cycle data pulse 88 aligns with zero optical output intensity.

It is readily understood that the reduced crossing level must be chosen such that the reduced duty cycle data pulse does not distort the RZ pulse of the pulse train. This choice depends on the initial shape of the RZ pulses and the data pulses. Once the reduced crossing level is chosen, it must be maintained with appropriate data modulator bias and data driver amplitude control loops (if required) as is known in the art.

Figure 7:
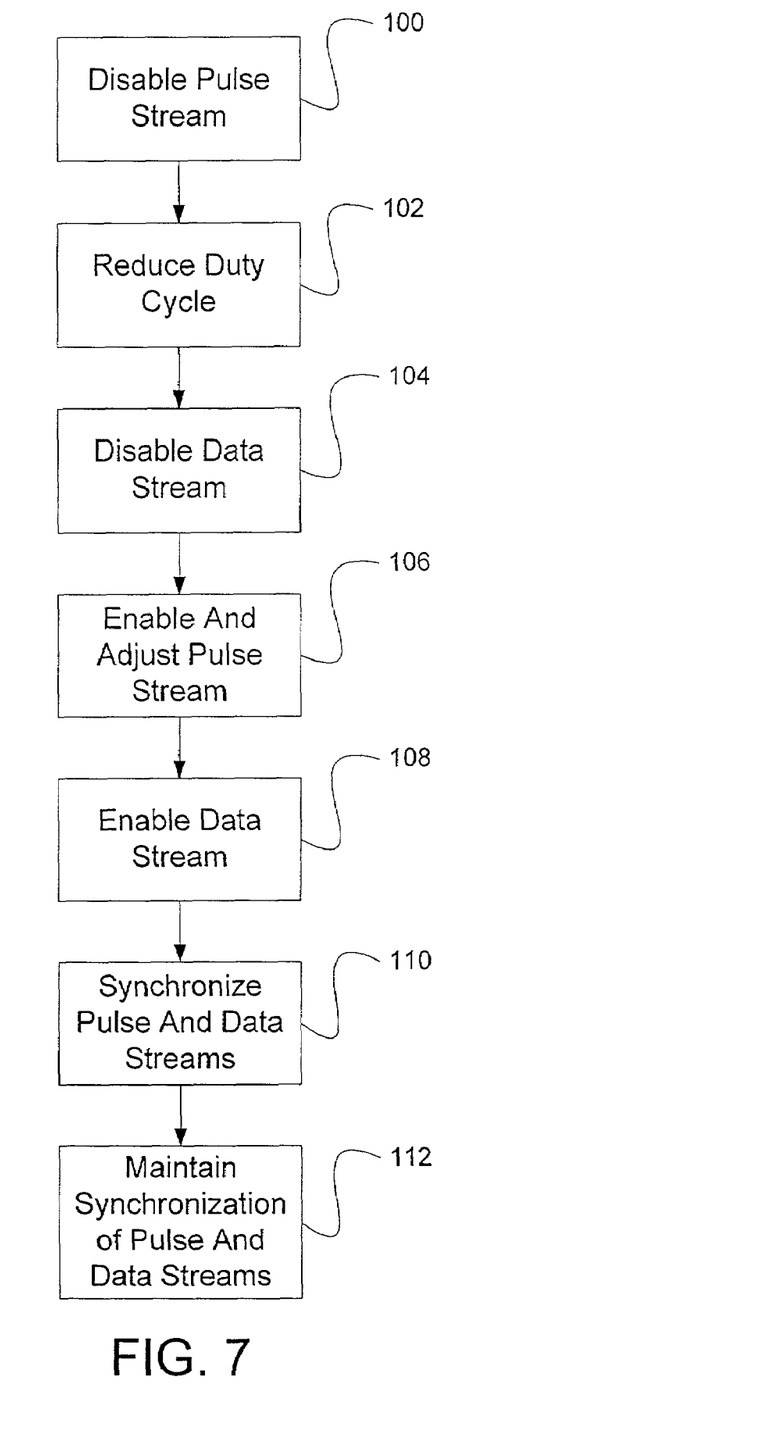
FIG. 7 is a flow-chart depicting an algorithm for use with the present invention.

Referring to FIG. 7, a flow-chart depicting an algorithm at time interval n is shown for use with the present invention. First, the pulse stream is disabled as shown at step 100 to permit reduction of the duty cycle. The duty cycle is then reduced at step 102 Subsequent to tuning of the crossing level, the data stream is disabled at step 104 and the pulse stream is enabled and the RZ pulse modulator bias and the pulse driver are adjusted to the proper settings. Thus, with the RZ pulse modulator bias and pulse driver properly adjusted, and with the data stream enabled at step 108, it is possible for a closed feedback loop to synchronize the pulse and data streams at step 110 by tracking an optimal phase offset setting of the pulse driver via dithering of the phase offset setting and monitoring of the output power. Various techniques exist for accomplishing this synchronization.

One technique for tracking the optimal phase offset is a digital technique. For example, the microcontroller increases the phase shifter setting to $\phi+\Delta\phi$, and measures the monitor power $P_+$ at the output of the transmitter. The microcontroller then decreases the phase shifter setting to $\phi-\Delta\phi$, and measures the monitor power P at the output of the transmitter. In other words, the phase shifter setting is dithered at an amount of phase offset change ($\Delta\phi$) and the output power is concurrently monitored. The microcontroller then attempts to converge on a power maximum. Specifically, the error function of the Proportional-Integral-Derivative (PID) control loop becomes err=$(P_+-P_-)$ and the microcontroller sets the new phase setting to $\phi(n+1)=PID_{101}$ (err$_i$, i$\in$[0,n]), where err$_i$ is the error-signal at iteration i, and where PID is a controller such as the integrator $\phi(n+1)=\Phi(n)+k_\phi err_n$, $k_\Phi>0$.

Optionally, one can control to a phase delay with a small offset from the one corresponding to maximum power, by using an offset in the error-signal: err=targetSlope−ditherSlope, where ditherSlope is defined as ditherSiope=$(P_+-P_-)$.

Another technique for tracking the optimal phase offset is an analog technique. The pulse stream phase-shifter setting is dithered at a frequency f, and the analog control loop attempts to maximize the frequency component at 2f (i.e. frequency doubling). Alternatively, the phase shifter setting is dithered at a frequency f and the control loop attempts to minimize the frequency component at the same frequency, f. Specifically, the feedback from a dither at a particular phase is of the same frequency as the frequency at which the dither occurs so long as the dither does not occur at optimal synchronization. If, however, the dither occurs at optimal synchronization, the feedback will reflect the change in slope over a maximum, and thus have a frequency that is twice that of the dither frequency. Thus, one may choose to maximize the feedback at twice the dither frequency. A complimentary result of optimal synchronization is that no feedback will exist at a frequency that is the same as that of the dither frequency, thus one may choose to minimize feedback at that frequency. An appropriate PID controller must be chosen, and particular attention must be paid to the choice of gains to prevent dithering at a minimum rather than a maximum.

Once the pulse and data sources are synchronized, transmission may take place while the synchronization is maintained at step 112. Specifically, the dithering techniques disclosed above with regard to step 110 may be used at appropriate time intervals to insure that the pulse and data sources remain synchronized. Given the preceding disclosure, alternative implementations of feedback control according to the present invention will be readily appreciated.

While the invention has been described in its presently preferred form, it will be understood that the invention is capable of modification without departing from the spirit of the invention as set forth in the appended claims.

What is claimed is:

1. A method for synchronizing an optical data signal in an optical communication system, comprising:
    generating an optical pulse stream;
    modulating the optical pulse signal with a data stream to form an optical data signal;
    disabling the optical pulse stream;
    setting a duty cycle of the data stream to a value less than fifty percent while the optical pulse stream is disabled;
    enabling the optical pulse stream and subsequently disabling the data stream;
    adjusting parameters of the optical pulse stream while the data stream is disabled;
    enabling the data stream;
    monitoring optical power level of the optical data signal; and
    adjusting a phase offset of the optical pulse stream to maximize the optical power level of the optical data signal, thereby synchronizing the optical pulse signal with the data stream.

2. The method of claim 1 further comprises generating an optical pulse stream having a return to zero transmission format.

3. The method of claim 1 wherein setting a duty cycle further comprises examining an eye-diagram of the data stream and lowering a crossing-level of the eye-diagram to a value less than fifty percent thereby reducing the duty cycle of the data stream.

4. The method of claim 3 wherein lowering a crossing-level further comprises reducing a duty cycle of the data stream at a data source for the data stream.

5. The method of claim 3 wherein lowering a crossing-level further comprim optically reducing a duty cycle of the optical data signal at an optical modulator.

6. The method of claim 1 wherein adjusting a phase offset further comprises dithering the phase offset setting at a dither frequency.

7. The method of claim 6 wherein the adjusting the phase offset further comprises maximizing a frequency component of the dither frequency at twice the dither frequency or minimizing a frequency component of the dither frequency at the dither frequency.

8. A propagating wave for transmission over an optical communications system, the propagating wave comprising the optical data signal synchronized according to the method of claim 1.

9. A transmitter for use with an optical communications system, said transmitter transmitting a signal comprising the optical data signal synchronized according to the method of claim 1.

10. An optical communications system, the system comprising:
    a transmission medium;
    a receiver; and
    the transmitter of claim 9.

* * * * *